(12) United States Patent
Apostolo et al.

(10) Patent No.: US 8,354,472 B2
(45) Date of Patent: Jan. 15, 2013

(54) FLUOROELASTOMER COMPOSITION

(75) Inventors: Marco Apostolo, Bellinzago (IT); Philip Schild, Brookhaven, PA (US); Lauren Morgan, Wenonah, NJ (US)

(73) Assignee: Solvay Solexis, Inc., Thorofare, NJ (US)

( * ) Notice: Subject to any disclaimer, the term of this patent is extended or adjusted under 35 U.S.C. 154(b) by 476 days.

(21) Appl. No.: 12/521,974

(22) PCT Filed: Dec. 21, 2007

(86) PCT No.: PCT/EP2007/064443
§ 371 (c)(1),
(2), (4) Date: Jul. 1, 2009

(87) PCT Pub. No.: WO2008/080897
PCT Pub. Date: Jul. 10, 2008

(65) Prior Publication Data
US 2010/0076159 A1    Mar. 25, 2010

Related U.S. Application Data

(60) Provisional application No. 60/883,177, filed on Jan. 3, 2007.

(30) Foreign Application Priority Data

Jun. 25, 2007   (EP) .................................... 07110924

(51) Int. Cl.
*C08F 214/22*   (2006.01)
*C08F 220/00*   (2006.01)
(52) U.S. Cl. .................................................. 525/326.3
(58) Field of Classification Search ............... 525/326.2, 525/326.3
See application file for complete search history.

(56) References Cited

U.S. PATENT DOCUMENTS

| | | | |
|---|---|---|---|
| 3,752,787 A | 8/1973 | De Brunner | |
| 3,876,654 A | 4/1975 | Pattison | |
| 5,319,025 A * | 6/1994 | Weigelt | 525/151 |
| 5,451,625 A | 9/1995 | Fukushi | |
| 5,501,881 A | 3/1996 | Fuller et al. | |
| 5,591,804 A * | 1/1997 | Coggio et al. | 525/276 |
| 6,111,028 A | 8/2000 | Brinati et al. | |
| 6,239,223 B1 * | 5/2001 | Effenberger et al. | 525/199 |
| 2002/0177666 A1 | 11/2002 | Grootaert et al. | |
| 2004/0044139 A1 | 3/2004 | Grootaert et al. | |
| 2005/0181261 A1 | 8/2005 | Yuan et al. | |
| 2005/0245691 A1 | 11/2005 | Stanga et al. | |

FOREIGN PATENT DOCUMENTS

| | | |
|---|---|---|
| EP | 0120462 A1 | 10/1984 |
| EP | 0182299 A2 | 5/1986 |
| EP | 0335705 A1 | 10/1989 |
| EP | 0684277 A1 | 11/1995 |
| JP | 8295776 A | 11/1996 |
| WO | WO2007085546 A1 | 8/2007 |

OTHER PUBLICATIONS

Pianca M. et al., "End groups in fluoropolymers", J. Fluorine Chem., 1999, vol. 95, p. 71-84 (14 pp.).

* cited by examiner

*Primary Examiner* — Ling Choi
*Assistant Examiner* — Chun-Cheng Wang
(74) *Attorney, Agent, or Firm* — Arent Fox LLP

(57) ABSTRACT

An ionically crosslinkable fluoroelastomer composition comprising:
(a) at least one fluoroelastomer [polymer (F)];
(b) at least one ionically crosslinking system comprising at least one accelerator and at least one curing agent;
(c) from 0.5 to 20 weight parts, per hundred parts of fluoroelastomer [polymer (F)], of at least one polar compound having boiling point of 150° C. or less, selected among:
alcohols having formula:

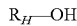

wherein $R_H$ is a $C_{1-12}$ hydrocarbon group, aliphatic or aromatic, substituted or unsubstituted, linear or branched;
aldehydes having formula:

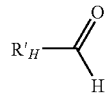

wherein $R'_H$ is a $C_{1-12}$ hydrocarbon group, aliphatic or aromatic, substituted or unsubstituted, linear or branched;
ketones having formula:

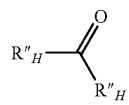

wherein $R''_H$ groups, equal or different from each other, are $C_{1-6}$ hydrocarbon groups, aliphatic or aromatic, substituted or unsubstituted, linear or branched;
esters having formula:

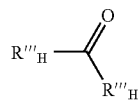

wherein $R'''_H$ groups, equal or different from each other, are $C_{1-6}$ hydrocarbon groups, aliphatic or aromatic, substituted or unsubstituted, linear or branched.

8 Claims, No Drawings

FLUOROELASTOMER COMPOSITION

CROSS-REFERENCE TO RELATED APPLICATIONS

The present application is a U.S. national stage application under 35 U.S.C. §371 of International Application No. PCT/EP2007/064443 filed Dec. 21, 2007, which claims the benefit of U.S. Provisional Application Ser. No. 60/883,177 filed Jan. 3, 2007, and of EP Application number 07110924.3 filed Jun. 25, 2007, these applications being herein incorporated by reference in their entirety for all purposes.

TECHNICAL FIELD

The invention pertains to a fluoroelastomer composition, to a process for its manufacture and to a process for its curing.

BACKGROUND ART

Fluorinated elastomers have found increasing application in specialized areas, such as high temperature resistant gaskets, seals, diaphragms, and tubing. Fabricated fluoroelastomer articles can withstand temperatures of about 250-350° C. while retaining their good elasticity. It is necessary for many applications, for example, gaskets for high-temperature reactors, that the fluoroelastomer article be resilient and have low compression set. This is accomplished by curing the article; that is, by vulcanizing or cross-linking the elastomer. Prior art processes for vulcanization of fluoroelastomers are well-known in the art and can be categorized among peroxydic route and ionic route.

Fluoroelastomers to be cured by the peroxidic route should advantageously comprise cure sites in their back-bone, either provided by suitable functional groups in recurring units from functional comonomers incorporated in the polymer chain or by reactive end-group, e.g. formed by suitable chain transfer agents (e.g. iodine-containing cure-sites). In such a case, curing can be carried out according to known techniques, comprising adding suitable peroxides capable to generate radicals by thermal decomposition, and curing coagents, i.e. polyfunctional unsaturated compounds able to generate crosslinking points.

Thus, JP 8295776 (ASAHI GLASS) Nov. 12, 1996 discloses a peroxide-vulcanisable fluororubber composition comprising a fluoroelastomer, an organic peroxide; a crosslinking aid having at least two unsaturated bonds; a divalent metal hydroxide or oxide; an organic onium compound; and a polar compound chosen among ester, ketones, sulfone compounds, alcohols, water; preferably among methanol, ethanol, propanol, i-propanol, n-butanol, s-butanol, t-butanol, dimethyl sulfone, diethyl sulfone, sulfolane, acetone, methyl ethyl ketone, acetylacetone, methyl acetate, ethyl acetate, and ethyl malonate, in an amount from 0.05 to 10 phr. The polar compound is believed to improve dispersibility of to organic onium compound and thus yield improved oilproof and thermal resistance properties in the corresponding vulcanizate.

EP 1566583 A (FREUDENBERG CARL KG) Aug. 24, 2005 discloses a fluoroelastomer composition suitable for the manufacture of gasket for fuel cells, said composition comprising a fluoroelastomer precursor comprising halogenated crosslinking sites, inert particulate fillers, a curing agent and magnesium oxide. Said composition can be provided under the form of liquid admixture of low viscosity, by admixing a solvent chosen among ketones, alcohols, esters.

US 2002177666 (3M INNOVATIVE PROPERTIES) Nov. 28, 2002 and US 2004044139 (3M INNOVATIVE PROPERTIES) Mar. 4, 2004 disclose a composition comprising a nitrogen-containing cure site monomer, a catalyst which is the reaction product between an organo-onium and an acid, said acid being, notably, an aromatic polyoxy compound, and, optionally, an alcohol (e.g. octanol or decanol).

Nevertheless, introduction of cure sites in the fluoroelastomer to be cured is sometimes tedious and costly and upper service temperature of fluoroelastomers cured via the peroxidic route is often limited.

It is thus preferred for several applications to cure the fluoroelastomers via the so-called ionic route. Curing by ionic route is generally carried out by addition of curing and accelerating agents, which are well known to the skilled in the art. While in curing via the peroxidic route radicals are formed, which generate reactive species by activation of suitable cure sites in the polymer chain, ionic curing proceeds by reactive ionic species, with no need of cure sites in the polymer nor of radical initiators.

It is thus clear that curing mechanisms of ionically curable fluoroelastomers and peroxide curable fluoroelastomers are completely different processes which imply different active species.

Ionically curable fluoroelastomers are often used in applications wherein a high processing throughput rate is required: it is thus a general requirement in this field to obtain high curing rates, so that processing cycles can be reduced.

There is thus a continuous need in the art for fluoroelastomer compositions which can be cured by the ionic route and which combine satisfactory cure rates with good processing safety and good storage stability of unvulcanized formulations; and which yield vulcanized polymers of good stress-strain properties and a low compression set.

DISCLOSURE OF INVENTION

It is thus an object of this application to provide a ionically crosslinkable fluoroelastomer composition comprising:

(a) at least one fluoroelastomer [polymer (F)];

(b) at least one ionically crosslinking system comprising at least one accelerator and at least one curing agent;

(c) from 0.5 to 20 weight parts, per hundred parts of fluoroelastomer [polymer (F)], of at least one polar compound having boiling point of 150° C. or less, selected among:

alcohols having formula:

wherein $R_H$ is a $C_{1-12}$ hydrocarbon group, aliphatic or aromatic, substituted or unsubstituted, linear or branched;

aldehydes having formula:

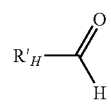

wherein $R'_H$ is a $C_{1-12}$ hydrocarbon group, aliphatic or aromatic, substituted or unsubstituted, linear or branched;

ketones having formula:

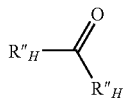

wherein R″$_H$ groups, equal or different from each other, are C$_{1-6}$ hydrocarbon groups, aliphatic or aromatic, substituted or unsubstituted, linear or branched;
esters having formula:

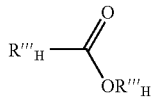

wherein R‴$_H$ groups, equal or different each other, are C$_{1-6}$ hydrocarbon groups, aliphatic or aromatic, substituted or unsubstituted, linear or branched.

Polar compound as above defined will be referred to herein below as polar compound (P).

The Applicant has found that thanks to the incorporation of the above-mentioned amount of the polar compound (P) having suitable volatility as above described, curing rate via the ionic route of the ionically crosslinkable composition is advantageously significantly increased, with no detrimental effect nor on compression set nor on mechanical properties. Moreover, while polar compound (P) advantageously participates in increasing curing rate, thanks to its volatility, it leaves no substantial residue in the fluoroelastomer, causing yellowing or other detrimental effect during the overall life of the cured fluoroelastomer part.

Thus, the ionically crosslinkable fluoroelastomer composition of the invention can be advantageously used in the high throughput manufacture of cured fluoroelastomer articles combining the advantages of rapid cure and of satisfactory stress/strain properties.

For the purposes of this invention, the term "fluoroelastomer" [polymer (F)] is intended to designate a fluoropolymer resin serving as a base constituent for obtaining a true elastomer, said fluoropolymer resin comprising more than 50% wt of recurring units derived from at least one ethylenically unsaturated monomer comprising at least one fluorine atom (hereafter, fluorinated monomer).

True elastomers are defined by the ASTM, Special Technical Bulletin, No. 184 standard as materials capable of being stretched, at room temperature, to twice their intrinsic length and which, once they have been released after holding them under tension for 5 minutes, return to within 10% of their initial length in the same time.

Non limitative examples of suitable fluorinated monomers are notably:
C$_2$-C$_8$ fluoro- and/or perfluoroolefins, such as tetrafluoroethylene, hexafluoropropene, pentafluoropropylene, and hexafluoroisobutylene;
C$_2$-C$_8$ hydrogenated monofluoroolefins, such as vinyl fluoride;
1,2-difluoroethylene, vinylidene fluoride and trifluoroethylene;
(per)fluoroalkylethylenes complying with formula CH$_2$=CH—R$_{f0}$, in which R$_{f0}$ is a C$_1$-C$_6$ (per)fluoroalkyl or a C$_1$-C$_6$ (per)fluorooxyalkyl having one or more ether groups;
chloro- and/or bromo- and/or iodo-C$_2$-C$_6$ fluoroolefins, like chlorotrifluoroethylene;
fluoroalkylvinylethers complying with formula CF$_2$=CFOR$_{f1}$ in which R$_{f1}$ is a C$_1$-C$_6$ fluoro- or perfluoroalkyl, e.g. —CF$_3$, —C$_2$F$_5$, —C$_3$F$_7$;
hydrofluoroalkylvinylethers complying with formula CH$_2$=CFOR$_{f1}$ in which R$_{f1}$ is a C$_1$-C$_6$ fluoro- or perfluoroalkyl, e.g. —CF$_3$, —C$_2$F$_5$, —C$_3$F$_7$;
fluoro-oxyalkylvinylethers complying with formula CF$_2$=CFOX$_0$, in which X$_0$ is a C$_1$-C$_{12}$ oxyalkyl, or a C$_1$-C$_{12}$ (per)fluorooxyalkyl having one or more ether groups, like perfluoro-2-propoxy-propyl;
fluoroalkyl-methoxy-vinylethers complying with formula CF$_2$=CFOCF$_2$ OR$_{f2}$ in which R$_{f2}$ is a C$_1$-C$_6$ fluoro- or perfluoroalkyl, e.g. —CF$_3$, —C$_2$F$_5$, —C$_3$F$_7$ or a C$_1$-C$_6$ (per)fluorooxyalkyl having one or more ether groups, like —C$_2$F$_5$—O—CF$_3$;
functional fluoro-alkylvinylethers complying with formula CF$_2$=CFOY$_0$, in which Y$_0$ is a C$_1$-C$_{12}$ alkyl or (per)fluoroalkyl, or a C$_1$-C$_{12}$ oxyalkyl, or a C$_1$-C$_{12}$ (per)fluorooxyalkyl, said Y$_0$ group having one or more ether groups and Y$_0$ comprising a carboxylic or sulfonic acid group, in its acid, acid halide or salt form;
fluorodioxoles, of formula:

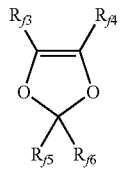

wherein each of R$_{f3}$, R$_{f4}$, R$_{f5}$, R$_{f6}$, equal or different each other, is independently a fluorine atom, a C$_1$-C$_6$ fluoro- or per(halo)fluoroalkyl, optionally comprising one or more oxygen atom, e.g. —CF$_3$, —C$_2$F$_5$, —C$_3$F$_7$, —OCF$_3$, —OCF$_2$CF$_2$OCF$_3$.

Fluoroelastomers [polymers (F)] are in general amorphous products or products having a low degree of crystallinity (crystalline phase less than 20% by volume) and a glass transition temperature (T$_g$) below room temperature. In most cases, these products correspond to copolymers having a T$_g$ below 0° C.

The fluoroelastomer [polymer (F)] has a heat of fusion, as determined according to ASTM D 3418 of less than 5 J/g, preferably of less than 4 J/g, more preferably of less than 1 J/g.

The polymer (F) comprises preferably more than 75% wt, more preferably more than 90% wt of recurring units derived from fluorinated monomers, and still more preferably more than 97% wt of recurring units derived from fluorinated monomers.

As the fluoroelastomer composition of the invention is intended for ionically crosslinking, there is advantageously no need of having within the fluoroelastomer specific cure-site monomers or moieties such as those required for peroxide curing.

Thus the fluoroelastomer (F) is preferably free from recurring units derived from cure-site monomers; fluoroelastomer (F) can be notably free from recurring units derived from bromo and/or iodo olefins, and/or free from recurring units derived from bromo and/or iodo fluoroalkyl vinyl ethers and/or free from recurring units derived from nitrogen-containing cure-site monomers, in particular monomers containing —CN groups (e.g. fluorinated vinyl ethers comprising nitrile groups).

Also, the fluoroelastomer (F) is preferably free from iodinated and/or brominated end-groups, such as those obtained when polymerizing in the presence of brominated and/or iodinated chain transfer agents.

The fluoroelastomer (F) advantageously comprises recurring units derived from vinylidene fluoride (VF$_2$) and/or from tetrafluoroethylene (TFE). Preferably, fluoroelastomer (F) consists of recurring units derived from vinylidene fluoride (VF$_2$) and/or from tetrafluoroethylene (TFE) and at least one other fluorinated monomer, as above described. The other fluoromonomer can be notably vinyl fluoride; trifluoroethylene; chlorotrifluoroethylene (CTFE); 1,2-difluoroethylene; tetrafluoroethylene (TFE); hexafluoropropylene (HFP); perfluoro(alkyl vinyl)ethers of formula $CF_2=CF-O-R'_f$, wherein $R'_f$ is a $C_{1-6}$ perfluoroalkyl group, such as perfluoro(methyl vinyl)ether (PMVE), perfluoro(ethyl vinyl)ether (PEVE), perfluoro(propyl vinyl)ether (PPVE), perfluoro(methoxyethyl vinyl ether); perfluoro-oxyalkylvinylethers complying with formula $CF_2=CFOX'_0$, in which $X'_0$ is a $C_1$-$C_{12}$ perfluorooxyalkyl having one or more ether groups; perfluoro(1,3-dioxole); perfluoro(2,2-dimethyl-1,3-dioxole) (PDD); the product of formula $CF_2=CFOCF_2CF(CF_3)OCF_2CF_2X$ in which X is —SO$_2$F, —CO$_2$H, —CH$_2$OH, —CH$_2$OCN or —CH$_2$OPO$_3$H; the product of formula $CF_2=CFOCF_2CF_2SO_2F$; the product of formula $F(CF_2)_nCH_2OCF=CF_2$ in which n is 1, 2, 3, 4 or 5; the product of formula $R_1CH_2OCF=CF_2$ in which $R_1$ is hydrogen or $F(CF_2)_z$, and z is 1, 2, 3 or 4; the product of formula $R_3OCF=CH_2$ in which $R_3$ is $F(CF_2)_z$ and z is 1, 2, 3 or 4; perfluorobutylethylene (PFBE); 3,3,3-trifluoropropene and 2-trifluoromethyl-3,3,3-trifluoro-1-propene.

The polymer (F) can be notably chosen among:
VF$_2$/HFP copolymers comprising (preferably consisting of) from 60 to 85% by moles of VF$_2$ and from 40 to 15% by moles of HFP;
VF$_2$/HFP/TFE terpolymers comprising (preferably consisting of) 45 to 85% by moles of VF$_2$, 15 to 45% by moles of HFP and up to 30% by moles of TFE,
VF$_2$/perfluoro(alkyl vinyl)ether/TFE terpolymers, comprising (preferably consisting of) from 50 to 80% by moles of VF$_2$, 5 to 50% by moles of perfluoro(alkyl vinyl)ether of formula $CF_2=CF-O-R'_f$, wherein $R'_f$ is a $C_1$-$C_6$ perfluoroalkyl group, and up to 20% by moles of TFE;
VF$_2$/ethylene/HFP/TFE polymers, comprising (preferably consisting of) from 20 to 30% by moles of VF$_2$, from 10 to 30% by moles of ethylene (E) and from 10 to 30% by moles of TFE, the remaining being HFP;
VF$_2$/E /perfluoro(alkyl vinyl)ether/TFE polymers comprising (preferably consisting of) from 20 to 30% by moles of VF$_2$, from 10 to 30% by moles of ethylene, from 18 to 27% by moles of perfluoro(alkyl vinyl)ether of formula $CF_2=CF-O-R'_f$, wherein $R'_f$ is a $C_{1-6}$ perfluoroalkyl group, and from 10 to 30% by moles of TFE;
perfluoro(alkyl vinyl)ether/TFE copolymers comprising (preferably consisting of) from 20 to 50% by moles of perfluoro(alkyl vinyl)ether of formula $CF_2=CF-O-R'_f$, wherein $R'_f$ is a $C_{1-6}$ perfluoroalkyl group, and from 50 to 80% by moles of TFE; and
VF$_2$/HFP/E/TFE polymers, comprising (preferably consisting of) from 4 to 75% by moles of VF$_2$, from 12 to 40% by moles of HFP, up to 35% by moles of E and from 2 to 60% by moles of TFE.

Very good results were obtained with fluoroelastomers consisting of recurring units derived from vinylidene fluoride (VF$_2$) and at least one other fluorinated monomer, as above detailed.

Excellent results have been obtained with fluoroelastomers chosen among:
vinylidene fluoride/hexafluoropropylene copolymers comprising (preferably consisting of) from 60 to 85% by moles of VF$_2$ and from 40 to 15% by moles of HFP;
VF$_2$/HFP/TFE terpolymers comprising (preferably consisting of) 45 to 85% by moles of VF$_2$, 15 to 45% by moles of HFP and up to 30% by moles of TFE.

According to a preferred embodiment of the invention, the polymer (F) advantageously comprises an amount of unstable —COF-type end groups of less than 0.5 mmol/kg.

To the purposes of the invention, the term "unstable —COF-type end groups" is intended to encompass fluoroacyl groups and derivatives thereof, such as —COW groups, wherein W represent Cl, Br, OM, with M being a hydrogen atom or a metal, preferably H or an alkaline metal.

Preferably, the amount of unstable COF-type end groups is of less than 0.1 mmol/kg, more preferably of less than 0.05 mmol/kg.

The amount of unstable COF-type end groups can be notably determined by FT-IR spectrometry, according to the method detailed here below, wherein said groups are reacted with ammonia.

A polymer (F) sample, submitted to a preliminary drying at 90° C. until constant weight, is compression moulded into a film having an average thickness between 50 and 300 μm. An FT-IR spectrum between 4000 cm$^{-1}$ and 400 cm$^{-1}$ is recorded, e.g. by using a Nicolet Nexus FT-IR equipment (256 scannings, resolution 2 cm$^{-1}$), from said film (spectrum 1). The film is then maintained for 12 hours in an environment saturated with ammonia vapours at 25° C., and a further FT-IR spectrum is recorded under same conditions (spectrum 2). The two spectra are elaborated by subtracting from the intensity/wavelength curve of the spectrum of the untreated specimen (spectrum 1) the corresponding curve of the specimen spectrum after exposure to ammonia vapours (spectrum 2), drawing the "difference" spectrum, which is normalized according to the following equation:

$$\frac{\text{spectrum 1} - \text{spectrum 2}}{\left[\frac{\text{film weight (g)}}{\text{film area (cm}^2\text{)}}\right]}.$$

The optical densities of absorption bands in the spectral region between 1900 and 1830 cm$^{-1}$, which are known to be related to the reaction product between the —COF end groups and ammonia, are measured and converted into values expressed as mmoles/kg of polymer (F) using the extinction coefficients reported in Table 1, page 73 of the report by PIANCA, M., et al. End groups o, fluoropolymers. *J. Fluorine Chem.* 1999, vol. 95, p. 71-84. The sensitivity limit of this method is 0.05 mmoles/Kg.

The fluoroelastomer (F) has a Mooney viscosity, measured according to ASTM D1646-04 (ML 1+10@ 121° C./250 F), advantageously from 5 to 250, preferably from 7 to 150, more preferably from 40 to 50.

The fluoroelastomer (F) can be prepared by any known method, such as emulsion or micro-emulsion polymerization, suspension or micro-suspension polymerization, bulk polymerization and solution polymerization.

The fluoroelastomer (F) is preferably prepared by emulsion polymerization, in the presence of a radical generator. Suitable radical generators are notably the alkaline persulphates, perborates and percarbonates. It is also possible to employ a combination of peroxy generators with reducers, such as sulphites, bisulphites, metabisulphites, thiosulphates, phosphites or hyposulphites of alkaline metals or of ammonium, or copper (I) salts, Fe (II) salts, silver salts and other easily oxidizable metal salts. It is possible to use also organic radical generators.

Otherwise, organic peroxides can be used as radical generators. Suitable organic peroxides useful as radical generators can be selected in particular from:
(a) dialkylperoxides, wherein alkyl has from 1 to 12 carbon atoms, for instance diterbutylperoxide (DTBP);
(b) dialkylperoxydicarbonates, wherein the alkyl has from 1 to 12 carbon atoms, for instance diisopropylperoxydicarbonate:
(c) diacylperoxides, wherein acyl has from 2 to 12 carbon atoms, for instance diacetylperoxide;
(d) peroxyesters having from 3 to 20 carbon atoms, for instance terbutylperoxyisobutyrate.

Polymers (F) obtained by emulsion polymerisation using the organic peroxides as above detailed are particularly suitable for the composition of the invention, as they advantageously comprise an amount of unstable —COF-type end groups of less than 0.5 mmol/kg, as above detailed.

It is possible to manufacture the fluoroelastomer in the presence of surfactants such as sodium laurylsulphate and ammonium perfluoro-octanoate.

The presence of a chain transfer may be useful during the polymerization in emulsion. The fluoroelastomers (F) obtained by copolymerization in emulsion can be isolated from the latex according to conventional methods, for example coagulation with an electrolyte or by freezing, followed by filtration, washing and drying.

The fluoroelastomer (F) can also be prepared by bulk polymerization or by solution polymerization in an organic liquid such as e.g. a chlorofluorohydrocarbon (Freon 113 or 114).

During the fluoroelastomer (F) preparation, the reaction mixture is preferably heated in a pressure reactor, previously "washed" with an inert gas, to temperatures ranging from 45° C. to 135° C. and pressures of from 4 to 40 kg/cm².

Curing agents for ionic curing are well known to those skilled in the art.

The curing agents useful for the compositions of the invention are advantageously selected from aromatic or aliphatic polyhydroxylated compounds or their derivatives and aromatic or aliphatic polythiol compounds or their derivatives.

Preferably the curing agent is selected among:
aromatic diphenol or dithiophenol-type derivatives of formula:

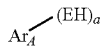

wherein $Ar_A$ is an arylene radical, comprising one or more than one condensed aromatic rings, optionally substituted, E is oxygen or sulphur, preferably E is oxygen, and a is an integer from 2 to 4, preferably 2 or 3;
diaromatic phenol or thiophenol derivatives of formula:

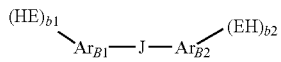

wherein $Ar_{B1}$ and $Ar_{B2}$, equal or different from each other, are chosen among arylene radicals, comprising one or more than one condensed aromatic rings, optionally substituted, J is a divalent bridging group selected from a bond, an alkylene radical having 1 to 6 carbon atoms, optionally substituted (e.g. C(CH$_3$)$_2$—) and/or optionally fluorinated (e.g. C(CF$_3$)$_2$—), a —O— radical, a —S— radical, a —SO$_2$— radical, a —C(O)— radical, E is oxygen or sulphur, preferably E is oxygen, and b1 and b2 are integers from 1 to 3, preferably 1;
perfluoropolyether diols of formula:

HO—CH$_2$—R$_{OF}$—CH$_2$—OH wherein R$_{OF}$ is a perfluoropolyether chain comprising recurring units chosen among those of formula:

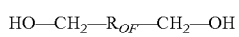

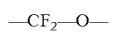

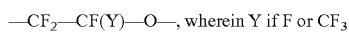

statistically distributed in said perfluoropolyether chain; and mixtures thereof.

Among those curing agents, bisphenol AF of formula:

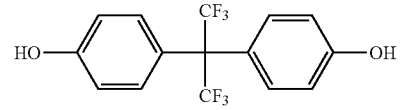

is particularly preferred.

The amount of curing agent is advantageously of at least 0.1, preferably at least 0.5, more preferably at least 1 weight parts per hundred parts of fluoroelastomer [polymer (F)].

The amount of curing agent is advantageously of at most 20, preferably at most 15, more preferably at most 6 weight parts per hundred parts of fluoroelastomer [polymer (F)].

To the purpose of the invention, the term accelerator is intended to denote an organo-onium compound which is capable of functioning as vulcanization accelerator, i.e. to increase curing rate. The term organo-onium compound, well known to those skilled in the art, designates the conjugated acid of a Lewis base (e.g. phosphine, amine, ether, sulphide) and can be notably formed by reacting said Lewis base with a suitable alkylating agent (e.g., an alkyl halide or acyl halide) resulting in the expansion on the valence of the electron donating atom of the Lewis base and a positive charge on the organo-onium compound.

Many of the organo-onium compounds useful in this invention comprise at least one heteroatom, i.e. a non-carbon atom, such as N, P, S, O, As, Sb bonded to organic or inorganic moieties.

Mixtures of two or more organo-onium compounds are also useful for this invention.

The organo-onium compound is preferably chosen among:
quaternary onium salts of general formula:

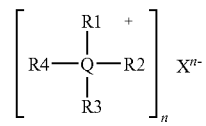

wherein Q is selected from nitrogen, phosphorous, arsenic, antimony; R1, R2, R3, R4, equal or different from each other, are independently selected from the group consisting of alkyl, aryl, alkenyl radicals, linear or branched, substituted or not substituted, optionally any pair of said R1, R2, R3, R4 groups can be connected with each other and with the Q atom for forming an heterocyclic ring; n is an integer equal to the valence of the anion X, preferably n is 1 or 2, and X is an anion, preferably chosen among monovalent or divalent anions, like halogenides, hydroxide, cyanides, isocyanide, thiocyanide, nitrate, sulfate, thiosulfate, formate, acetate, tetrafluoroborate, tetraarylborates, and the like. Quaternary organo-onium compounds wherein phosphorous, arsenic, antimony or nitrogen atom is the central atom bearing the positive charge (Q in formula above) are generally known, respectively, as phosphonium, arsonium, stibonium or ammonium salts; suitable quaternary organo-onium compounds are notably those described in U.S. Pat. No. 3,876,654 (DUPONT DE NEMOURS) Apr. 8, 1975 and in EP 0335705 A (MINNESOTA MINING AND MANUFACTURING COMPANY) Oct. 4, 1989;

amino-phosphonium compounds complying with following formula:

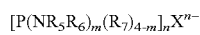

wherein m is an integer from 1 to 3, $R_5$, $R_6$ and $R_7$, equal or different from each other and at each occurrence are independently selected from alkyl, cycloalkyl, aryl, arylalkyl, linear or branched, substituted or non substituted; optionally $R_5$ and $R_6$ can be linked each other so as to form an heterocyclic ring with the nitrogen atom; amino-phosphonium compounds particularly suitable for the invention are those described in EP 0684277 A (AUSIMONT S.P.A.) Nov. 29, 1995;

sulfonium compounds, i.e. a sulphur-containing organic compound in which at least one sulphur atom is covalently bonded to three organic moieties, the same or different from each other, having 1 to 20 carbon atoms by means of sulphur-carbon covalent bonds, and which is ionically associated with a suitable anion. Preferred sulfonium compounds are those described in EP 0335705 A (MINNESOTA MINING AND MANUFACTURING COMPANY) Oct. 4, 1989;

triaryl phosphorane compounds, i.e. compounds having a triaryl phosphoranylidene group of formula:

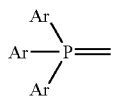

wherein both of the non-designated bonds of this group are attached to a single carbon atom and wherein Ar, equal or different at each occurrence, denotes an aryl group, monocyclic or polycyclic, substituted or not substituted, like notably a phenyl, tolyl, xylyl, naphthyl, chlorophenyl, methoxyphenyl and the like. Triaryl phosphorane compounds suitable for the invention are notably those referred in U.S. Pat. No. 3,752,787 B (DU PONT DE NEMOURS) Aug. 14, 1973;

bis(triphosphin)-iminium salts (or PNN salts) of general formula:

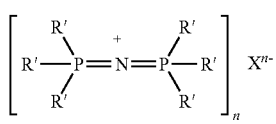

herein R', equal or different at each occurrence, denotes an aryl group, monocyclic or polycyclic, substituted or not substituted, like notably a phenyl, tolyl, xylyl, naphthyl, chlorophenyl, methoxyphenyl and the like, or an alkyl group, substituted or not, optionally halogenated, or an aralkyl group, in which at least one hydrogen atom of the aryl part is substituted by at least one $C_{1-20}$ alkyl group, n is 1 or 2 and X is an anion, preferably chosen among monovalent or divalent anions, like halogenides, hydroxide, cyanides, isocyanide, thiocyanide, nitrate, sulfate, thiosulfate, formate, acetate, tetrafluoroborate, tetraarylborates, and the like. Suitable bis(triarylphosphin)-iminium salts useful for the invention are notably those described in EP 120462 A (MONTEDISON S.P.A.) Oct. 3, 1984 and in EP 182299 A (ASAHI KASEI) May 28, 1986.

Quaternary phosphonium salts (i.e. quaternary onium salts as above detailed, with Q=P) and amino-phosphonium compounds as above detailed are preferred accelerators in the compositions of the invention.

According to a more preferred embodiment of the invention, the accelerator is the phosphonium salt 1,1-dyphenyl-1-benzyl-N-diethylphosforanamine chloride.

The amount of the accelerator is of advantageously at least 0.01, preferably at least 0.05, more preferably at least 0.1 weight parts per hundred parts of fluoroelastomer (F).

The amount of the accelerator is of advantageously at most 10, preferably at most 5, more preferably at most 4 weight parts per hundred parts of fluoroelastomer (F).

The ionically crosslinking system comprise at least one curing agent and at least one accelerator, that is to say that it can comprise one or more than one curing agent and one or more than one accelerator as above described.

The curing agent and the accelerator can be added to the composition of the invention either separately or under the form of an adduct.

When an adduct is used, instead of using the accelerating agent and the curing agent separately, it generally comprises an accelerating agent and a curing agent in molar ratio from 1:2 to 1:5, preferably from 1:3 to 1:5. In said adduct, the accelerating agent is preferably an organo onium compound as above detailed, advantageously having a positive charge, and the curing agent is preferably selected from aromatic or aliphatic polyhydroxylated compounds or their derivatives and aromatic or aliphatic polythiol compounds or their derivatives.

Said adduct can be notably obtained by heating above the melting temperature of its components a mixture of the accelerating agent and the curing agent in the above mentioned molar ratios.

For the preparation of the adduct, preferred organo-onium compounds are those comprising as cation the 1,1-diphenyl-1-benzyl-N-diethyl-phosphoranamine moiety or the tetrabutyl phosphonium moiety, very preferably the 1,1-diphenyl-1-benzyl-N-diethyl-phosphoranamine moiety.

Among curing agents, diaromatic phenol or thiophenol derivatives as above defined of formula:

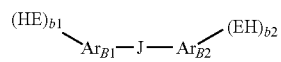

wherein $Ar_{B1}$ and $Ar_{B2}$, J, E, b1 and b2 have the same meaning as above detailed, are preferred when an adduct is to be formed; Very preferably, bisphenol AF is used.

Adducts which are suitable to be used for the purpose of the invention are notably those described in EP 0684277 A (AUSIMONT SPA) Nov. 29, 1995.

The ionically crosslinkable fluoroelastomer composition comprises from 0.05 to 20 weight parts, per hundred parts of fluoroelastomer [polymer (F)], of at least one polar compound (P), as above detailed.

The Applicant thinks, without this limiting the scope of its invention, that the addition of the polar compound (P) enables advantageously substantially modifying the polarity of the crosslinking system, so that the curing rate via the ionic route and the crosslinking behaviour of the composition thereof is substantially modified, increasing reactivity of both the curing agent and the accelerator.

The amount of the polar compound (P) is of advantageously at least 0.05, preferably at least 0.1, more preferably at least 0.5 weight parts per hundred parts of fluoroelastomer (F).

The amount of the polar compound (P) is of advantageously at most 20, preferably at most 15, more preferably at most 10, most preferably at most 5 weight parts per hundred parts of fluoroelastomer (F).

The expression "at least one polar compound (P)" is understood to mean that the composition of the invention can comprise one or more than one polar compound (P). Herein below, the term polar compound (P) will be understood both in the singular and the plural.

Non limitative examples of aldehydes having formula:

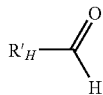

as above detailed are notably acetaldehyde, propionaldehyde, and the like.

Non limitative examples of ketones having formula:

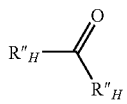

as above detailed are notably acetone, methyl-ethyl-ketone, and the like; acetone is a particularly preferred ketone.

Non limitative examples of esters having formula:

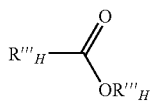

as above detailed are notably methyl-acetate, ethyl-acetate, propyl-acetate, and the like.

According to a preferred embodiment of the invention, the polar compound (P) is chosen among aliphatic alcohols, as above detailed. Aliphatic alcohols are particularly preferred in view of their easy availability and low toxicity.

It is essential that for the aliphatic alcohol of having an alkyl group $R_H$, as above defined, so that the polarity of such alcohol is satisfactory and the alcohol still possesses adequate volatility properties enabling its evaporation during curing and/or post-curing.

Preferably, the aliphatic alcohol is chosen among methanol, ethanol, isopropanol, n-propanol, n-butanol, iso-butanol, tert-butanol.

More preferably, the alcohol is chosen among methanol, ethanol, and/or isopropanol.

Optionally, the ionically crosslinkable fluoroleastomer composition may comprise additional component, such as notably:

i) one or more inorganic acid acceptors selected from those known to the skilled in the field of ionic curing of fluoroelastomers, in amounts from 1 to 40 weight parts for 100 parts of fluoroelastomer (F); among the compound of the type (i), MgO, $Ca(OH)_2$, $Sr(OH)_2$, $Ba(OH)_2$ can be mentioned.

ii) one or more basic compounds selected from those known in the ionic curing of fluoroelastomers in amounts from 0.5 to 10 weight parts per 100 parts of fluoroelastomer (F). The basic compounds II) are commonly selected from organic metal salts of weak acids, such as for example carbonates, benzoates, oxalates and phosphites of Ca, Sr, Ba, Na and K.

Also, reinforcing fillers can be used in the composition of the invention; reinforcing fillers are preferably selected among carbon black, barium sulphate, silica, silicates, semi-crystalline fluoropolymers. Should the reinforcing filler be a semi-crystalline fluoropolymer, it is preferably a tetrafluoroethylene homopolymer or copolymer comprising from 0 to 10% by moles of a comonomer chosen among $C_3$-$C_8$ perfluoroolefins, such as hexafluoropropylene, perfluoroalkylvinylethers of formula $CF_2=CF-O-R_f$, wherein $R_f$ is a $C_1$-$C_6$ perfluoroalkyl, or perfluoro-oxyalkylvinylethers of formula $CF_2=CF-OX$, wherein X is a $C_1$-$C_{12}$ perfluorooxyalkyl having one or more ether groups. Such semi-crystalline fluoropolymer is preferably used under the form of particles having an average primary particle size of from 5 to 100 nm, preferably from 20 to 60 nm.

Other conventional additives can be added to the composition of the invention, such as thickeners, pigments, antioxidants, stabilizers, processing supporting agents.

As the composition of the invention is intended for ionic curing, there is generally no need of radical initiators, e.g. peroxides. Thus the composition of the invention is advantageously free from radical peroxides.

Still an object of the invention is a process for the manufacture of the composition as above detailed.

It is thus an object of the invention a process for the manufacture of a ionically crosslinkable fluoroelastomer composition comprising:

(a) at least one fluoroelastomer [polymer (F)];
(b) at least one ionically crosslinking system comprising at least one accelerator and at least one crosslinking agent;
(c) from 0.5 to 20 weight parts, per hundred parts of fluoroelastomer [polymer (F)], of at least one polar compound (P), as above defined.

The process of the invention advantageously comprises mixing components (a) to (c) as above detailed by means of any mixing apparatus known to be useful for preparing rubber compositions, including notably a roller-type rubber mill, a Banbury mixer and the like.

Still another object of the invention is a process for the curing of the composition as above detailed.

It is thus an object of the invention a process for ionically curing a ionically crosslinkable fluoroelastomer composition comprising:

(a) at least one fluoroelastomer [polymer (F)];
(b) at least one ionically crosslinking system comprising at least one accelerator and at least one crosslinking agent;
(c) from 0.5 to 20 weight parts, per hundred parts of fluoroelastomer [polymer (F)], of at least one polar compound (P), as above detailed.

It is understood that the process of the invention does not generally involve the use of a radical initiator.

Curing can be advantageously effected by heating the composition as above detailed at a temperature of at least 150° C. One skilled in the art will realize that the best curing temperature for a particular application will depend on such factors as the nature and proportion of components (a) to (c) as well as the properties needed in the final product.

Conventional rubber-curing presses, moulds, extruders and the like, provided with suitable heating and curing means can be used so as to obtain a cured fluoroelastomer article.

Also, when maximum heat resistance and dimensional stability are required, the curing process advantageously comprises a post-curing operation wherein the cured fluoroelastomer article is heated in a oven, e.g. an air-circulating oven, for an additional period of about 1-48 hours and at a temperature of about 200 to 260° C.

The ionically crosslinkable fluoroelastomer composition of the invention has beneficial utility in the high throughput manufacture of cured fluoroelastomer articles having low compression set. It is very useful for the production of heat-resistant resilient O-ring seals, shaft seals, gaskets, tubing and the like. The invention can be employed to manufacture such articles while achieving additional advantages of rapid cure and satisfactory stress/strain properties.

The present invention will be now described in more details by reference to the following examples, whose purposes are merely illustrative and do not limit the scope of the invention.

Raw Materials

Fluoroelastomer (A): fluoroelastomer (A) was manufactured according to example 1 of U.S. Pat. No. 6,111,028 (AUSIMONT SPA (IT)) Aug. 29, 2000.

TECNOFLON® N535 is a $VF_2$/HFP fluoroelastomer having a fluorine content of 66% wt commercially available from Solvay Solexis Inc.

TECNOFLON® FOR4391 is a cure incorporated $VF_2$/HFP/TFE fluoroelastomer having a fluorine content of 70% wt, comprising bisphenol AF and 1,1-dyphenyl-1-benzyl-N-diethylphosforanamine chloride, commercially available from Solvay Solexis Inc.

TECNOFLON® FOR50HS is a cure incorporated $VF_2$/HFP fluoroelastomer having a fluorine content of 66% wt, comprising bisphenol AF and 1,1-dyphenyl-1-benzyl-N-diethylphosforanamine chloride, commercially available from Solvay Solexis Inc.

Masterbatch (M1): masterbatch M1 is a compounded mixture comprising 50% wt of bisphenol AF and 50% wt of a TECNOFLON® fluoroelastomer (copolymer $VF_2$/HFP 80/20 mol %).

Masterbatch (M5HS): masterbatch M5HS is a compounded mixture comprising 30% wt of the adduct between bisphenol AF and 1,1-dyphenyl-1-benzyl-N-diethylphosforanamine chloride in a 5:1 molar ratio and 70% wt a TECNOFLON® fluoroelastomer (copolymer $VF_2$/HFP 80/20 mol %).

ELASTOMAG® 170 MgO is a magnesium oxide commercially available from Rohm and Haas.

MAGLITE® DE MgO is a magnesium oxide commercially available from CPH Solutions Corp.

Carbon black N990 is commercially available from CAN-CARB.

Crossliking Properties

Behaviour of the composition in the crosslinking process was assessed according to the ASTM D 2084 method, using a MDR (Moving Die Rheometer) 2000E Alpha Tecnologies Ltd. The following test conditions have been used:
oscillation frequency: 1.66 MHz;
oscillation amplitude: +/−0.5 degrees;
temperature: 177° C.;
specimen weight: 7-8 g;
test duration: as detailed in the tables, sufficient to reach the plateau.

The following parameters have been recorded:
Tq min: minimum torque level, expressed in units of lbf.in;
Tq max: maximum torque level at plateau, in units of lbf.in;
Ts2: time necessary to reach a torque equal to Tq min+2 lbf.in
Txx: time necessary to reach a torque equal to Tq min+x(Tq max-Tq min)/100, with x=50, 90.

Mechanical and Sealing Property Determination on Cured Samples

13×13×2 mm plaques and O-rings (size class=214) have been cured in a pressed mould at 177° C. for a time equal to t'95 of the MDR curve, and then post-treated in an air circulating oven at a given temperature and for a given time as specified in the Examples.

The tensile properties have been determined on specimens punched from the plaques, according to the ASTM D 412 method, method C. M100% is the tensile strength in MPa at an elongation of 100%

T.S. is the tensile strength in MPa;

E.B. is the elongation at break in %.

The Shore A hardness (3") has been determined on 3 pieces of plaque piled according to the ASTM D 2240 method.

The compression set has been determined on O-ring (class: 214), according to the ASTM D 329 method.

Preparation and Curing Behaviour of Compositions Comprising Isopropanol

A first set of compositions were prepared by mixing Fluoroelastomer (A) with 0.7 phr of M1, 7.8 phr of M5HS, 7 phr of MAGLITE® DE magnesium oxide and 30 phr of carbon black MT990.

Comparative example 1 was carried out by crosslinking the composition without the addition of any polar compound, while runs 2 to 4 were carried out adding to the same composition different amounts of isopropanol as detailed in table 1 here below.

It can be observed that while the curing rate was significantly increased (times for increasing torque and achieving maximum torque were substantially reduced when isopropanol was present), this happened with no substantial modification of the mechanical properties, so that tensile strength, hardness, compression sets, and all other relevant fluoroelastomer mechanical performances remained almost unchanged.

Comparative run 5 and run 6 were carried out in a similar manner, but using TECNOFLON® N535 with 0.7 phr of M1, 7.8 phr of M5HS, 7 phr of MAGLITE® DE magnesium oxide and 30 phr of carbon black MT990, without any polar compound (run 5) or by addition of isopropanol (run 6).

Also with this formulation, the curing rate was significantly increased (times for increasing torque and achieving maximum torque were substantially reduced when isopropanol was present).

TABLE 1

| | | Run | | | | | |
|---|---|---|---|---|---|---|---|
| | | Comp-1 | 2 | 3 | 4 | Comp-5 | 6 |
| | phr isopropanol | 0.0 | 0.2 | 0.5 | 1.0 | 0.0 | 3.0 |
| MDR (12 min) | Tq min (lbf·in) | 0.62 | 0.65 | 0.59 | 0.49 | 1.21 | 1.15 |
| | Ts2 (sec) | 224 | 199 | 194 | 164 | 166 | 145 |
| | T50 (sec) | 272 | 241 | 236 | 199 | 220 | 190 |
| | T90 (sec) | 401 | 365 | 354 | 296 | 352 | 298 |
| | Tq max (lbf·in) | 10.9 | 11.6 | 11.3 | 12.3 | 14.9 | 16.1 |
| Mech Prop[(2)] | M100% | 3.8 | 4.3 | 4.5 | 4.2 | 5.6 | 6.3 |
| | T.S. | 14.4 | 14.5 | 14.6 | 15.3 | 15.5 | 12.8 |
| | E.B. | 217 | 213 | 200 | 209 | 191 | 153 |
| | Hardness | 64.8 | 65.1 | 64.8 | 65.3 | 69.6 | 70.5 |
| | C.S.[(1)] | 18.4 | 17.4 | 18.0 | 17.8 | 12 | 11 |

[(1)]Examples 1-4: compression set (200° C. for 70 h) on O-ring post-cured at 250° C. for 1 hour; Examples 5-6: compression set (200° C. for 70 h) on O-ring post-cured at 250° C. for 8 + 16 hour;
[(2)]Mechanical properties were evaluated after 1 h post-cure at 250° C. for examples 1-4 and after 8 + 16 h post-cure at 250° C. for examples 5-6.
Other experiences were carried out using fluoroelastomer (A) compounded with 2.2 phr of M1, 5.0 of M5HS, 3 phr of calcium hydroxide, 7 phr of MAGLITE ® magnesium oxide and 30 phr of carbon black MT990.

Even in the case of this fluoroelastomer composition, the ionic curing was found to be accelerated by the addition of isopropanol in amounts ranging from 1 to 3 phr (see table 2).

TABLE 2

| | | Run | | | |
|---|---|---|---|---|---|
| | | Comp-7 | 8 | 9 | 10 |
| | phr isopropanol | 0.0 | 1 | 2 | 3 |
| MDR (30 min) | Tq min (lbf·in) | 0.9 | 0.8 | 0.8 | 0.8 |
| | Ts2 (sec) | 205 | 162 | 133 | 106 |
| | T50 (sec) | 286 | 250 | 215 | 193 |
| | T90 (sec) | 473 | 411 | 356 | 322 |
| | Tq max (lbf·in) | 18.0 | 17.6 | 19.0 | 19.2 |
| Mech Prop[(3)] | M100% (MPa) | 6.6 | 6.9 | 6.6 | 7.1 |
| | T.S. (MPa) | 16.0 | 16.6 | 17.0 | 16.8 |
| | E.B. (%) | 165 | 172 | 182 | 176 |
| | Hardness (Shore A) | 68.1 | 70.0 | 70..2 | 71.3 |
| O-ring | C.S.[(1)] | 22 | 23 | 25 | 25 |
| | C.S.[(2)] | 15 | 16 | 19 | 19 |

[(1)]Compression set (200° C. for 70 h) on O-ring post-cured at 250° C. for 1 h.
[(2)]Compression set (200° C. for 22 h) on O-ring post-cured at 250° C. for 1 h.
[(3)]Mechanical properties were evaluated after 1 h post-cure at 250° C.

Preparation and curing behaviour of compositions comprising ethanol

A composition comprising:
TECNOFLON® FOR4391, which is a cure incorporated $VF_2$/HFP/TFE terpolymer with 70 wt % of fluorine content compounded with:
3 phr of ELASTOMAG® magnesium oxide;
6 phr of calcium hydroxide; and
30 phr of carbon black was tested for its curing behaviour as above detailed, with or without the addition of 1 phr of ethanol. Ethanol enabled increasing curing rate without negatively affecting mechanical properties. Results are summarized in table 3 here below.

TABLE 3

| | | Run | |
|---|---|---|---|
| | | Comp-11 | 12 |
| | phr ethanol | 0.0 | 1 |
| MDR (6 min) | Tq min (lbf·in) | 1.4 | 2.0 |
| | Ts2 (sec) | 79 | 34 |
| | T50 (sec) | 97 | 42 |
| | T90 (sec) | 129 | 59 |
| | Tq max (lbf·in) | 23.7 | 17.9 |
| Mech Prop[(1)] | M100% (MPa) | 5.94 | 5.94 |
| | T.S. (MPa) | 12.89 | 13.66 |
| | E.B. (%) | 261 | 279 |
| | Hardness (Shore A) | 85 | 82 |

[(1)]Mechanical properties were evaluated after 8 + 16 h post-cure at 250° C.

Preparation and Curing Behaviour of Compositions Comprising Different Polar Compounds Compositions comprising fluoroelastomer (A) compounded with 2.2 phr of Ml, 5.8 phr of M5HS, 3 phr of calcium hydroxide, 7 phr of MAGLITE® Magnesium oxide; and 30 phr of carbon black were submitted to curing in the absence and in the presence of 1 weight part of a polar compound as detailed in Table 4 here below and tested for their curing behaviour and mechanical properties, including O-ring compression set. Results are detailed in table 4 here below.

TABLE 4

| | | Run | | | | | | |
|---|---|---|---|---|---|---|---|---|
| | | Comp 13 | 14 | 15 | 16 | 17 | 18 | 19 |
| Polar compound (phr) | isopropanol | 0 | 1 | 0 | 0 | 0 | 0 | 0 |
| | methanol | 0 | 0 | 1 | 0 | 0 | 0 | 0 |
| | ethanol | 0 | 0 | 0 | 1 | 0 | 0 | 0 |
| | Ter-butanol | 0 | 0 | 0 | 0 | 1 | 0 | 0 |
| | Propylacetate | 0 | 0 | 0 | 0 | 0 | 1 | 0 |
| | methylacetate | 0 | 0 | 0 | 0 | 0 | 0 | 1 |

TABLE 4-continued

| | | Run | | | | | | |
|---|---|---|---|---|---|---|---|---|
| | | Comp 13 | 14 | 15 | 16 | 17 | 18 | 19 |
| MDR (30 min) | Tq min (lbf · in) | 0.99 | 0.94 | 0.95 | 0.95 | 0.97 | 0.93 | 0.99 |
| | Ts2 (min) | 3.14 | 2.22 | 2.28 | 2.16 | 2.43 | 2.46 | 2.46 |
| | T50 (min) | 4.30 | 3.15 | 3.19 | 3.08 | 3.46 | 3.52 | 3.53 |
| | T90 (min) | 6.45 | 4.42 | 4.48 | 4.30 | 5.29 | 5.34 | 5.43 |
| | Tq max (lbf · in) | 18.5 | 20.1 | 20.7 | 20.2 | 19.4 | 19.2 | 19.0 |
| Mech Prop(3) | M100% | 757 | 700 | 697 | 729 | 699 | 679 | 717 |
| | T.S. (kpsi) | 2.13 | 1.77 | 1.68 | 1.83 | 1.81 | 1.77 | 1.87 |
| | E.B. | 221 | 230 | 215 | 227 | 227 | 215 | 215 |
| | Hardness | 70 | 70 | 71 | 72 | 71 | 71 | 71 |
| O-ring | C.S.(1) | 25.8 | 27.6 | 22.9 | 24.5 | 25.3 | 25.4 | 25.8 |
| | C.S.(2) | 15.7 | 20.1 | 16.8 | 15.9 | 19.6 | 18.1 | 18.3 |

(1)Compression set (200° C. for 70 h) on O-ring after press-cure
(2)Compression set (200° C. for 22 h) on O-ring after press-cure
(3)Mechanical properties were evaluated after 1 h post-curing at 250° C.

Preparation and curing behaviour of composition comprising polar compound and comparative examples with non-polar compounds Compositions comprising 100 weight parts of TECNOFLON® FOR50HS (which is a cure incorporated VF$_2$/HFP copolymer with 66 wt % of fluorine content) compounded with 7 weight parts of ELASTOMAG® 170 Magnesium oxide and 30 weight parts of carbon black N990 were submitted to curing in the absence and in the presence of 1 weight part of a polar or non-polar compound as detailed in Table 5 here below and tested for their curing behaviour and mechanical properties. Results are detailed in table 5 here below. It is clear form the table that the use of acetone improves the curing rate, while non-polar compounds like toluene or heptane do not have any effect.

TABLE 5

| | | Run | | | |
|---|---|---|---|---|---|
| | | Comp 20 | 21 | Comp 22 | Comp 23 |
| Compound (phr) | Acetone | 0.0 | 1 | 0.0 | 0.0 |
| | Heptane | 0.0 | 0.0 | 1 | 0.0 |
| | Toluene | 0.0 | 0.0 | 0.0 | 1 |
| MDR (6 min) | Tq min (lbf · in) | 0.9 | 0.9 | 0.8 | 0.8 |
| | Ts2 (sec) | 104 | 82 | 104 | 105 |
| | T90 (sec) | 201 | 163 | 201 | 198 |
| | Tq max (lbf · in) | 17.3 | 17.3 | 17.3 | 17.4 |
| Mech Prop(1) | M100% (psi) | 666 | 646 | 685 | 668 |
| | T.S. (psi) | 2374 | 2319 | 2412 | 2177 |
| | E.B. (%) | 240 | 233 | 239 | 224 |
| | Hardness (Shore A) | 72 | 72 | 73 | 71 |

(1)Mechanical properties were evaluated after 1 h post-cure at 250° C.

The invention claimed is:
1. An ionically crosslinkable fluoroelastomer composition comprising:
(a) at least one fluoroelastomer, said fluoroelastomer (F) being free from recurring units derived from nitrogen-containing cure-site monomers;
(b) at least one ionically crosslinking system comprising at least one accelerator and at least one curing agent;
(c) from 0.5 to 20 weight parts, per hundred parts of fluoroelastomer, of at least one polar compound having boiling point of 150° C. or less, selected from the group consisting of:
alcohols having formula:

$R_H$—OH wherein $R_H$ is a $C_{1-12}$ hydrocarbon group, aliphatic or aromatic, substituted or unsubstituted, linear or branched;
aldehydes having formula:

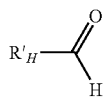

wherein $R'_H$ is a $C_{1-12}$ hydrocarbon group, aliphatic or aromatic, substituted or unsubstituted, linear or branched;
ketones having formula:

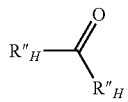

wherein $R''_H$ groups, equal or different from each other, are $C_{1-6}$ hydrocarbon groups, aliphatic or aromatic, substituted or unsubstituted, linear or branched; and
esters having formula:

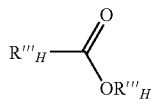

wherein $R'''_H$ groups, equal or different from each other, are $C_{1-6}$ hydrocarbon groups, aliphatic or aromatic, substituted or unsubstituted, linear or branched,
wherein the polymer (F) is selected from the group consisting of:
VF$_2$/hexafluoropropylene (HFP) copolymers comprising from 60 to 85% by moles of VF$_2$ and from 40 to 15% by moles of HFP;
VF$_2$/HFP/TFE terpolymers comprising 45 to 85% by moles of VF$_2$, 15 to 45% by moles of HFP and up to 30% by moles of TFE,
VF$_2$/perfluoro(alkyl vinyl) ether/TFE terpolymers, comprising from 50 to 80% by moles of VF$_2$, 5 to 50% by moles of perfluoro(alkyl vinyl) ether of formula CF$_2$=CF—O—R'$_f$,
wherein R'$_f$ is a $C_{1-6}$ perfluoroalkyl group, and up to 20% by moles of TFE;
VF$_2$/ethylene/HFP/TFE polymers, from 20 to 30% by moles of VF$_2$, from 10 to 30% by moles of ethylene (E) and from 10 to 30% by moles of TFE, the remaining being HFP;
VF$_2$/E/perfluoro(alkyl vinyl) ether/TFE polymers comprising from 20 to 30% by moles of VF$_2$, from 10 to 30% by moles of ethylene, from 18 to 27% by moles of perfluoro(alkyl vinyl) ether of formula $CF_2=CF-O-R'_f$, wherein $R'_f$ is a $C_{1-6}$ perfluoroalkyl group, and from 10 to 30% by moles of TFE;

perfluoro(alkyl vinyl) ether/TFE copolymers comprising from 20 to 50% by moles of perfluoro(alkyl vinyl) ether of formula $CF_2=CF-O-R'_f$, wherein $R'_f$ is a $C_{1-6}$ perfluoroalkyl group, and from 50 to 80% by moles of TFE: and $VF_2$/HFP/E/TFE polymers, comprising from 4 to 75% by moles of $VF_2$, from 12 to 40% by moles of HFP, up to 35% by moles of E and from 2 to 60% by moles of TFE.

2. The composition of claim 1, wherein the polymer (F) comprises an amount of unstable —COF-type end groups of less than 0.5 mmol/kg.

3. The composition of claim 2, wherein the polymer (F) is obtained by emulsion polymerization using an organic peroxide selected from the group consisting of:
(a) dialkylperoxides, wherein alkyl has from 1 to 12 carbon atoms;
(b) dialkylperoxydicarbonates, wherein the alkyl has from 1 to 12 carbon atoms:
(c) diacylperoxides, wherein acyl has from 2 to 12 carbon atoms; and
(d) peroxyesters having from 3 to 20 carbon atoms.

4. The composition of claim 1, wherein the accelerator is an organo-onium selected from the group consisting of:
quaternary onium salts of general formula:

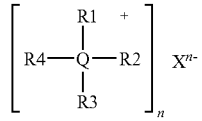

wherein Q is selected from nitrogen, phosphorous, arsenic, antimony; R1,R2,R3,R4, equal or different from each other, are independently selected from the group consisting of alkyl, aryl, alkenyl radicals, linear or branched, substituted or not substituted, optionally any pair of said R1, R2, R3, R4 groups can be connected with each other and with the Q atom for forming an heterocyclic ring; n is an integer equal to the valence of the anion X, and X is an anion;

amino-phosphonium compounds complying with following formula:

$[P(NR_5R_6)_m(R_7)_{4-m}]_n X^{n-}$ wherein m is an integer from 1 to 3, $R_5$, $R_6$ and $R_7$, equal to or different from each other and at each occurrence are independently selected from alkyl, cycloalkyl, aryl, arylalkyl, linear or branched, substituted or non substituted; optionally $R_5$ and $R_6$ can be linked each other so as to form an heterocyclic ring with the nitrogen atom;

sulfonium compounds, i.e. a sulphur-containing organic compound in which at least one sulphur atom is covalently bonded to three organic moieties, the same or different from each other, having 1 to 20 carbon atoms by means of sulphur-carbon covalent bonds, and which is ionically associated with a suitable anion;

triaryl phosphorane compounds, i.e. compounds having a triaryl phosphoranylidene group of formula:

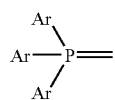

wherein both of the non-designated bonds of this group are attached to a single carbon atom and wherein Ar, equal or different at each occurrence, denotes an aryl group, monocyclic or polycyclic, substituted or not substituted; and bis(triphosphin)-iminium salts (or PNN salts) of general formula:

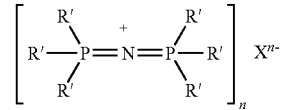

wherein R', equal or different at each occurrence, denotes an aryl group, monocyclic or polycyclic, substituted or not substituted, or an alkyl group, substituted or not, optionally halogenated, or an aralkyl group, in which at least one hydrogen atom of the aryl part is substituted by at least one $C_{1-20}$ alkyl group, n is 1 or 2 and X is an anion.

5. The composition of claim 1, wherein the curing agent is selected from the group consisting of:
aromatic diphenol or dithiophenol-type derivatives of formula:

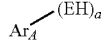

wherein $Ar_A$ is an arylene radical, comprising one or more than one condensed aromatic rings, optionally substituted, E is oxygen or sulphur, and a is an integer from 2 to 4;

diaromatic phenol or thiophenol derivatives of formula:

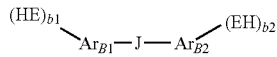

wherein $Ar_{B1}$ and $Ar_{B2}$, equal or different from each other, are chosen among arylene radicals, comprising one or more than one condensed aromatic rings, optionally substituted, J is a divalent bridging group selected from the group consisting of a bond, an alkylene radical having 1 to 6 carbon atoms, optionally substituted and/or optionally, a —O— radical, a —S— radical, a —$SO_2$— radical, and a —C(O)— radical; E is oxygen or sulphur, and b1 and b2 are integers from 1 to 3; and perfluoropolyether diols of formula:

$HO-CH_2-R_{OF}-CH_2-OH$ wherein $R_{OF}$ is a perfluoropolyether chain comprising recurring units selected from the group consisting of those of formula:

—$CF_2$—O—

—$CF_2CF_2$—O—

—$CF_2$—CF(Y)—O—, wherein Y is F or $CF_3$

—$CF_2CF_2CF_2$—O— statistically distributed in said perfluoropolyether chain; and mixtures thereof.

6. The composition of claim 1, wherein the aliphatic alcohol is selected from the group consisting of methanol, ethanol, isopropanol, n-propanol, n-butanol, iso-butanol, and tert-butanol.

7. A process for the manufacture of the ionically crosslinkable fluoroelastomer composition according to claim 1, comprising mixing together the polymer (F), the ionically crosslinking system, and the polar compound.

8. A process for ionically curing the ionically crosslinkable fluoroelastomer composition according to claim 1, comprising heating the ionically crosslinkable fluoroelastomer composition at a temperature of at least 150° C.

* * * * *